(12) United States Patent
Yamaguchi

(10) Patent No.: US 10,099,454 B2
(45) Date of Patent: Oct. 16, 2018

(54) COVER TAPE FOR PACKAGING ELECTRONIC PART

(71) Applicant: SUMITOMO BAKELITE CO., LTD., Shinagawa-ku, Tokyo (JP)

(72) Inventor: Ryo Yamaguchi, Tokyo (JP)

(73) Assignee: SUMITOMO BAKELITE CO., LTD., Shinagawa-ku, Tokyo (JP)

( * ) Notice: Subject to any disclaimer, the term of this patent is extended or adjusted under 35 U.S.C. 154(b) by 342 days.

(21) Appl. No.: 14/903,154

(22) PCT Filed: Jul. 8, 2014

(86) PCT No.: PCT/JP2014/068167
§ 371 (c)(1),
(2) Date: Jan. 6, 2016

(87) PCT Pub. No.: WO2015/005330
PCT Pub. Date: Jan. 15, 2015

(65) Prior Publication Data
US 2016/0129675 A1 May 12, 2016

(30) Foreign Application Priority Data
Jul. 9, 2013 (JP) .................................. 2013-143395

(51) Int. Cl.
 *B32B 27/36* (2006.01)
 *B32B 27/00* (2006.01)
 (Continued)

(52) U.S. Cl.
 CPC ................ *B32B 27/08* (2013.01); *B32B 7/12* (2013.01); *B32B 27/302* (2013.01);
 (Continued)

(58) Field of Classification Search
 CPC ....... B32B 27/365; B32B 27/32; B32B 27/08; B32B 27/302; B32B 27/306;
 (Continued)

(56) References Cited

U.S. PATENT DOCUMENTS 5,346,765 A * 9/1994 Maeda ............... H05K 13/0084
428/323
2009/0246518 A1 10/2009 Fujimura et al.
(Continued)

FOREIGN PATENT DOCUMENTS

JP 09-267450 10/1997
JP 11-147569 6/1999
(Continued)

OTHER PUBLICATIONS

International Search Report for International Patent Application No. PCT/JP2014/068167 dated Oct. 21, 2014, 3 pages.
(Continued)

*Primary Examiner* — William K Cheung
(74) *Attorney, Agent, or Firm* — Amin, Turocy & Watson LLP

(57) ABSTRACT

The object of the present invention is to provide a cover tape for packaging an electronic part which enables the reduction of the production time, and decreases the defective fraction due to the temperature variation of the sealing trowel, the present invention provides a cover tape for packaging an electronic part which includes a base layer and a sealant layer, and is closely adhered to a carrier tape, wherein the sealant layer is made of a resin composition; a main component in the resin composition has a melting point of 100° C. or less; a peeling strength A under fixed measurement conditions after heat-sealing to a polycarbonate sheet through the sealant layer at 220° C. for 0.015 seconds and a peeling strength C under the fixed measurement conditions
(Continued)

after heat-sealing to a polycarbonate sheet through the sealant layer at 180° C. for 0.015 seconds satisfy conditional expressions 1 and 2 below; and after peeling, a part of the sealant layer remains on a surface of the carrier tape to which the sealant layer is closely adhered; Conditional expression 1: 20 (g)≤A≤70 (g) and Conditional expression 2: 0.43≤C/A≤1.0.

7 Claims, 1 Drawing Sheet

(51) Int. Cl.
 *B32B 27/08* (2006.01)
 *B32B 7/12* (2006.01)
 *B32B 27/32* (2006.01)
 *B32B 27/30* (2006.01)
 *B32B 27/34* (2006.01)

(52) U.S. Cl.
 CPC .......... *B32B 27/306* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *B32B 2250/02* (2013.01); *B32B 2250/03* (2013.01); *B32B 2250/24* (2013.01); *B32B 2307/306* (2013.01); *B32B 2307/31* (2013.01); *B32B 2307/50* (2013.01); *B32B 2307/518* (2013.01); *B32B 2307/748* (2013.01); *B32B 2405/00* (2013.01); *B32B 2439/00* (2013.01); *B32B 2439/40* (2013.01); *B32B 2457/00* (2013.01); *B32B 2553/00* (2013.01); *B32B 2581/00* (2013.01)

(58) Field of Classification Search
 CPC ..... B32B 27/308; B32B 27/325; B32B 27/34; B32B 7/12; B32B 2307/748; B32B 2307/50; B32B 2307/306; B32B 2307/31; B32B 2307/518; B32B 2439/40; B32B 2250/24; B32B 2250/03; B32B 2250/02; B32B 2457/00; B32B 2405/00; B32B 2553/00; B32B 2581/00
 USPC .................................................. 428/412, 500
 See application file for complete search history.

(56) References Cited

U.S. PATENT DOCUMENTS

2010/0266826 A1   10/2010   Yonezawa
2014/0010978 A1    1/2014   Masui

FOREIGN PATENT DOCUMENTS

| JP | 11-511418 | 10/1999 |
| JP | 2011-121602 | 6/2011 |
| JP | 2012-188133 | 10/2012 |
| JP | 2012-214783 | 11/2012 |
| WO | 97/10693 | 3/1997 |
| WO | 2007/123241 | 11/2007 |
| WO | 2010/018791 | 2/2010 |

OTHER PUBLICATIONS

Written Opinion for International Patent Application No. PCT/JP2014/068167 dated Oct. 21, 2014, 3 pages.
UIS C 0806-3, 1999.

* cited by examiner

COVER TAPE FOR PACKAGING ELECTRONIC PART

This application is the National Stage Entry of PCT International Application No. PCT/JP2014/068167 filed on Jul. 8, 2014, which claims the benefit of priority of Japanese Patent Application No. 2013-143395 filed in Japan on Jul. 9, 2013, all of which are hereby expressly incorporated by reference.

TECHNICAL FIELD

The present invention relates to a cover tape for packaging an electronic part.

BACKGROUND ART

A surface mounting electronic component, such as integrated circuit (IC), transistor, diode, condenser, and piezoelectric resistor, is supplied after being packaged in an electronic part package including a tray having an embossed pocket which can conform the shape of an electronic part or a carrier tape which continuously includes the embossed pockets, and a cover tape which can be heat-sealed on the tray or the carrier tape.

The carrier tape in which electronic parts are packaged is generally wound onto a reel made of paper or plastic, and the condition is maintained before mounting. In a mounting process, the electronic parts which are the contents stored in pockets are automatically removed from the pockets in the carrier tape or the tray from which the cover tape has been delaminated, and surface-mounted onto electronic circuit boards.

In recent years, as down-sizing and high functionality are accelerating, in order to improve productivity by reducing heat-sealing time, heat-sealing temperature or heat-sealing pressure are adjusted to be higher or larger than before.

In addition, it is necessary to mold the shape of the pocket in the carrier tape so as to be smaller. For this reason, the workability and strength of the pocket are improved by changing the material for the carrier tape from polystyrene-based material which has been used to engineering plastics, such as a polycarbonate-based resin having a high rigidity.

However, since the engineer plastics have a higher softening temperature than that of polystyrene, it is necessary to increase the heat-sealing temperature to higher than before in order to securely adhere the carrier tape and the cover tape.

Due to the request for improvement of productivity and the change of the material for the cover tape, it is examining that the temperature setting for heat-sealing the cover tape to the carrier tape is increased from the conventional heat-sealing temperature in a range of 120° C. to 160° C. to a higher temperature range of about 180° C. to about 220° C.

However, while the heat-sealing temperature is increasing, when the softening temperature of the material for the cover tape is lower, there is a problem in which a sealing trowel is contaminated in heat-sealing. In addition, when the softening temperature of a cushion layer is low, the thickness of the cushion layer is decreased due to flow of the resin of the cushion layer. Thereby, there is a problem in that the strength of the cover tape itself is decreased.

A method for preventing the contamination of the sealing trowel, a method for preventing the flow of the resin by increasing the heat resistance of the cushion layer is disclosed in Patent Document 1.

In addition, Patent Document 2 discloses a method for widening the heat-sealing temperature range by improving the sealing layer. However, when the sealing time is reduced in such a cover tape, there is a problem in that the stability of the peeling strength is not sufficient.

In addition, when heat-sealing is carried out, the temperature of sealing trowel is sometimes decreased immediately after production starts or production restarts. Furthermore, it is well known that the temperature of the sealing trowel varies depending on the surrounding environment during production. The temperature variation of the sealing trowel causes the variation of peeling strength of the cover tape. The variation of the peeling strength sometimes results in defective mounting of parts.

[Patent Document 1] PCT International Publication No. WO 10/018791
[Patent Document 2] PCT International Publication No. WO 07/123241

DISCLOSURE OF THE INVENTION

Problems to be Solved by the Invention

The object of the present invention is to provide a cover tape for packaging an electronic part which has sufficient peeling strength at high speed sealing, enables the reduction of the production time, has a peeling strength with a small temperature dependency and thereby decreases the defective fraction due to the temperature variation of the sealing trowel.

Means for Solving Problem

The object is achieved by the following present inventions (1) to (4) below.

(1) A cover tape for packaging an electronic part which includes a base layer and a sealant layer, and is closely adhered to a carrier tape,
wherein the sealant layer is made of a resin composition;
a main component in the resin composition has a melting point of 100° C. or less;
a peeling strength A under measurement conditions below after heat-sealing to a polycarbonate sheet through the sealant layer at 220° C. for 0.015 seconds and a peeling strength C under the measurement conditions below after heat-sealing to a polycarbonate sheet through the sealant layer at 180° C. for 0.015 seconds satisfy conditional expressions 1 and 2 below; and
after peeling, a part of the sealant layer remains on a surface of the carrier tape to which the sealant layer is closely adhered;

$$20\ (g) \leq A \leq 70\ (g) \qquad \text{Conditional expression 1}$$

$$0.43 \leq C/A \leq 1.0 \qquad \text{Conditional expression 2}$$

Measurement conditions: the sealant layer of the cover tape for packaging an electronic part having a length of 500 mm is adhered to an electro-conductive polycarbonate sheet having a width of 8 mm such that the cover tape and the polycarbonate sheet are overlapped at 5 mm in width, and a peeling strength is measured in accordance with JIS C-0806-3 at measurement speed of 300 mm/min, and the average peeling strength is calculated.

(2) The cover tape for packaging an electronic part according to (1),
wherein the cover tape further includes an intermediate layer between the base layer and the sealant layer;

a resin of the base layer includes at least one selected from the group consisting of biaxially stretched polyester and biaxially stretched polypropylene, and when the cover tape is peeled from the carrier tape, cohesive failure of the sealant layer occurs, and a part of the sealant layer remains on the carrier tape.

(3) The cover tape for packaging an electronic part according to (1) or (2), wherein a main component of the resin composition of the sealant layer is at least one selected from the group consisting of polyethylene, ethylene-vinyl acetate copolymer, ethylene-(meth)acrylic acid copolymer, ethylene-methyl(meth) acrylate copolymer, ethylene-methyl acrylate copolymer, ethylene-ethyl acrylate copolymer, and ethylene-butyl acrylate copolymer.

(4) The cover tape for packaging an electronic part according to any one of (1) to (3), wherein a surface resistance value at 23° C. and 50% RH of the sealant layer which is opposite to the base layer is $1 \times 10^{12} \Omega$ or less.

Effects of the Invention

The present invention provides a cover tape for packaging an electronic part which has sufficient peeling strength at high speed sealing, enables to reduce the production time, has small temperature dependency of the peeling strength and thereby decrease the defective fraction due to the temperature variation of the sealing trowel.

PREFERRED EMBODIMENT OF THE PRESENT INVENTION

One embodiment of the cover tape for packaging an electronic part according to the present invention will be explained in detail referring to figures.

Figure 1:
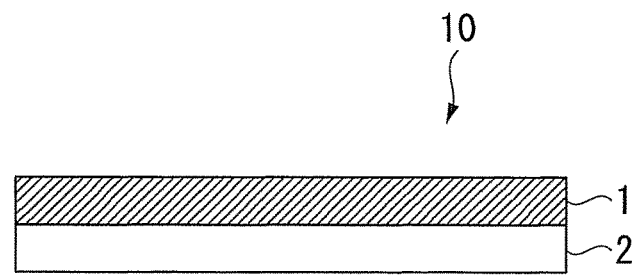
FIG. 1 is a cross-sectional view showing one embodiment of the cover tape for packaging an electronic part.

The cover tape 10 for packaging an electronic part according to this embodiment includes a base layer and a sealant layer 2 shown in FIG. 1.

When a peeling strength after heat-sealing the cover tape 10 for packaging an electronic part to a polycarbonate sheet through the sealant layer 2 at 220° C. for 0.015 seconds is defined as "A", "A" is preferably 20 g or more and 70 g or less, and more preferably 30 g or more and 60 g or less.

Thereby, when the sealing time is reduced to improve the productivity, the reliability of packaging of elements during the transportation can be maintained, and mounting defects can be decreased.

In addition, when a peeling strength after heat-sealing the cover tape 10 for packaging an electronic part to a polycarbonate sheet through the sealant layer 2 at 160° C. for 0.015 seconds is defined as "B", the ratio (B/A) between "B" and "A" is preferably 0.28 or more and 1.28 or less, and more preferably 0.5 or more and 1.0 or less.

Thereby, it is possible to prevent contamination of the heat-sealing trowel, and stably perform heat-sealing in a wide heat-sealing temperature range. Due to this, process control becomes easily.

When a peeling strength after heat-sealing the cover tape 10 for packaging an electronic part to a polycarbonate sheet through the sealant layer at 180° C. for 0.015 seconds is defined as "C", the ration (C/A) between "C" and "A" is preferably 0.43 or more and 1.0 or less, and more preferably 0.5 or more and 1.0 or less.

Thereby, stability of the peeling strength in a heat-sealing temperature range from 180° C. to 220° C. can be ensured. The defective rate in mounting, which is caused by variation of peeling strength due to instability of the heat-sealing temperature immediately after heat-sealing starts or restarts, can be reduced.

Furthermore, when a peeling strength after heat-sealing the cover tape 10 for packaging an electronic part to a polycarbonate sheet through the sealant layer 2 at 200° C. for 0.015 seconds is defined as "D", the ration (C/D) between "C" and "D" is preferably 0.5 or more and 1.0 or less, and more preferably 0.6 or more and 1.0 or less.

Thereby, stability of the peeling strength in a heat-sealing temperature range from 200° C. to 220° C. can be ensured.

The peeling strength is measured in the present invention as shown below.

An electro-conductive polycarbonate sheet having a width of 8 mm is adhered to the sealant layer 2 of the cover tape 10 for packaging an electronic part having a length of 500 mm such that the conductive polycarbonate sheet and the cover tape are overlapped by 5 mm in width. Then, the conductive polycarbonate sheet and the cover tape are heat-sealed using a dual type heat-sealing trowel, in which each trowel has a width of 0.5 mm and a length of 54 mm, under the following heat-sealing conditions.

<Heat-Sealing Conditions>
Heat-sealing temperature: certain temperature described
Duration of pressing the heat-sealing trowel: 0.015 second/time
Number of pressing the heat-sealing trowel: 13 times
Load of pressing the heat-sealing trowel: 4.0 kgf
Width of heat-sealing: 0.5 mm×2 lines The peeling strength of samples obtained by heat-sealing as shown above is measured in accordance with JIS C-0806-3. Moreover, the measurement speed is adjusted to 300 mm/min. The average peeling strength is used.

(Base Layer 1)

As the base layer 1 used in the cover tape 10 for packaging an electronic part, any films which are obtained by processing suitable types of materials according to the application can be used as long as the films have mechanical strength to withstand external forces applied, such as during tape processing and heat-sealing to the carrier tape, and has heat resistance to withstand heat-sealing.

Specifically, polyester-based resins, polyamide-based resins, polyolefin-based resins, polyacrylate-based resins, polymethacrylate-based resins, polyimide-based resins, polycarbonate-based resins, ABS resins, and the like can be used as the material of base layer 1. Among these resins, polyester-based resins are preferable. In addition, polyethylene terephthalate is more preferable to improve mechanical strength. Furthermore, it is possible to use a laminate having two or more layers made of the resins above as the base layer 1.

It is also preferable to use NYLON® 6 to improve mechanical strength and flexibility.

Unstretched films can be used as the base layer 1. However, in order to improve mechanical strength of the entire cover tape, it is preferable to use a uniaxially stretched film or a biaxially stretched film. In particular, it is preferable to use at least one of a biaxially stretched polyester film, and a biaxially stretched polypropylene film.

The thickness of base layer 1 is preferably 12 μm or more and 25 μm or less, and more preferably 12 μm or more and 20 μm or less. When the thickness of the base layer 1 is 25 μm or less, the rigidity of the cover tape 10 is not too high. For this reason, when twisting stress is applied to the carrier tape after heat-sealing, the cover tape can conform to the deformations of the carrier tape. As a result, it becomes difficult to delaminate the cover tape from carrier tape easily. In addition, when the thickness of the base layer 1 is 12 μm or more, the cover tape has satisfactory mechanical strength. For these reasons, it is possible to inhibit the problem in that the cover tape is ruptured during high speed peeling to remove the electronic parts stored.

The base layer 1 may contain an antistatic agent, a slipping agent, and an antiblocking agent as long as they do not damage the properties of the base layer 1.

(Sealant Layer 2)

The sealant layer 2 seals between the cover tape for packaging an electronic part and the carrier tape by heat-sealing the sealant layer 2 to the carrier tape. In addition, the sealant layer 2 can be stably peeled off from the carrier tape.

The resin constituting the sealant layer 2 has a melting point of 100° C. or less. Thereby, it is possible to exert excellent heat-sealing properties to the material of the carrier tape even when the heat-sealing time is short.

The melting point of the resin constituting the sealant layer 2 is not limited as long as the melting point is 100° C. or less. However, the melting point is preferably 95° C. or less.

When the melting point of the resin of the sealant layer is 100° C. or less, the effects above can be remarkably obtained.

Any resins can be used as the resin of the sealant layer 2 as long as the melting point is 100° C. or less. Examples of the resin of the sealant layer 2 include ethylene-based resin, methacrylate-based resin, ethylene glycol-based resin, and polystyrene-based resin. Among these resins, the sealant layer 2 preferably contains an ethylene-based resin.

The interaction of the close contact surface of the sealant layer is reduced, and blocking while storing is prevented by adding ethylene-based resin to the sealant layer 2.

Any ethylene-based resins can be used. Examples of ethylene-based resin include polyethylene, ethylene-vinyl acetate copolymer, vinyl chloride-vinyl acetate copolymer, ethylene-(meth)acrylic acid copolymer, ethylene-methyl (meth)acrylate copolymer, ethylene-methyl acrylate copolymer, and ethylene-ethyl acrylate copolymer. Among these resins, ethylene-ethyl acrylate copolymer is preferably used.

As a method for peeling the cover tape from the carrier tape, a cohesive failure delamination method for cohesively failing the heat sealant layer can be used. Cohesive failure is phenomenon in which the heat sealant resin itself is ruptured when the cover tape is peeled from the carrier tape. The cohesive failure delamination can prevent an electrical charge when peeling because peeling is carried out between homogenous resins, compared with a transfer delamination and an interfacial delamination. The heat sealant layer which can be cohesively failed can be produced by adding at least one selected from the group consisting of polystyrene, styrene.butadiene.styrene block copolymer (SBS), styrene-.ethylene.butylene.styrene block copolymer (SEBS), styrene.isoprene.styrene block copolymer (SIS), styrene.ethylene.propylene.styrene block copolymer (SEPS), hydrogenated styrene.butadiene random copolymer (HSBR), styrene-methyl(meth)acrylate copolymer (MS), styrene.acrylonitrile copolymer resin (SAN), and acrylonitrile.butadiene.styrene resin (ABS) in a resin of the sealant layer as an incompatible component.

In particular, when transparency is important, styrene-methyl(meth)acrylate copolymer (MS) is preferably used.

In addition, the surface resistance value at 23° C., and 50% RH of the sealant layer 2, which is opposite to the base layer, is preferably $1 \times 10^{12} \Omega$ or less. Thereby it is possible to prevent the mounting defects caused by static electricity. The surface resistance value is more preferably $1 \times 10^6 \Omega$ or more and $1 \times 10^{12} \Omega$ or less, and most preferably $1 \times 10^6 \Omega$ or more and $1 \times 10^{10} \Omega$. When the surface resistance value is in the range, the effects above can be remarkably exerted. Moreover the surface resistance value is measured in accordance with JIS K6911.

The thickness of the sealant layer 2 is not particularly limited. However, the thickness of the sealant layer is preferably 2 μm or more and 15 μm or less, and more preferably 5 μm or more and 10 μm or less.

When the thickness of the sealant layer 2 is in the range above, the stability of peeling strength is improved.

In addition, the thickness ratio of the sealant layer 2 in the cover tape 10 for packaging an electronic part is preferably 5% or more and 25% or less, and more preferably 10% or more and 25% or less.

When the thickness ratio of the sealant layer 2 in the cover tape 10 for packaging an electronic part is in the range above, the stability of the peeling strength is improved.

Combination between the base layer 1 and the sealant layer 2 is not particularly limited. However, when the base layer 1 is made of polyethylene terephthalate, the sealant layer 2 is preferably made of ethylene-methyl(meth)acrylate copolymer or ethylene-(meth)acrylic acid copolymer. In particular, when the base layer 1 is made of polyethylene terephthalate, the sealant layer 2 is preferably made of ethylene-methyl(meth)acrylate copolymer. Thereby, the interaction of the close contact surface of the sealant layer is reduced, and blocking while storing is prevented.

Figure 2:
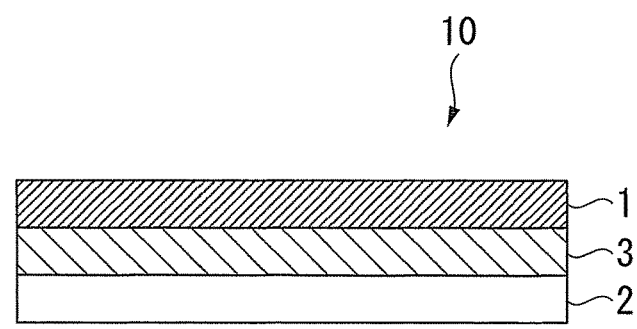
FIG. 2 is a cross-sectional view showing another embodiment of the cover tape for packaging an electronic part.

In addition, as shown in FIG. 2, the cover tape for packaging an electronic part may include an intermediate layer 3 between the base layer 1 and the sealant layer 2. The intermediate layer 3 improves the cushioning properties of the entire cover tape 10 for packaging an electronic part, and the adhesion between the cover tape 10 for packaging an electronic part and the carrier tape, which is an adherent, during heat-sealing. Any resins can be used in the intermediate layer 3. However, examples of the resin used in the intermediate layer 3 include olefin-based resin, styrene-based resin, and cyclic olefin-based resin. Among these resins, the intermediate layer 3 preferably contains olefin-based resin.

When the intermediate layer 3 contains olefin-based resin, the cushioning properties of the entire cover tape 10 for packaging an electronic part is further improved, and the adhesion between the cover tape 10 for packaging an electronic part and the carrier tape, which is an adherent, during heat-sealing.

The thickness of the intermediate layer 3 is not particularly limited. However, the thickness of the intermediate layer 3 is preferably 10 μm or more and 30 μm or less, and more preferably 15 μm or more and 25 μm or less.

When the thickness of the intermediate layer 3 is in the range above, the cushioning properties of the entire cover tape 10 for packaging an electronic part is further improved, and the adhesion between the cover tape 10 for packaging an electronic part and the carrier tape, which is an adherent, during heat-sealing.

The thickness of the entire cover tape 10 for packaging an electronic part is preferably 20 μm or more and 100 μm or less, and more preferably 35 μm or more and 60 μm or less. When the thickness of the entire cover tape 10 for packaging an electronic part is in the range above, the twist of the cover tape 10 for packaging an electronic part can be reduced when the cover tape 10 for packaging an electronic part is attached in a sealing device, and the workability is improved.

The method for manufacturing the cover tape 10 for packaging an electronic part is not limited. However, the cover tape 10 for packaging an electronic part can be produced by an extrusion lamination method in which the sealant layer 2 is layered on the base layer 1 or a method in which a sheet of the sealant layer 2 is formed by extrusion, and the sheet of the sealant layer 2 is laminated to the base layer.

Figure 3:
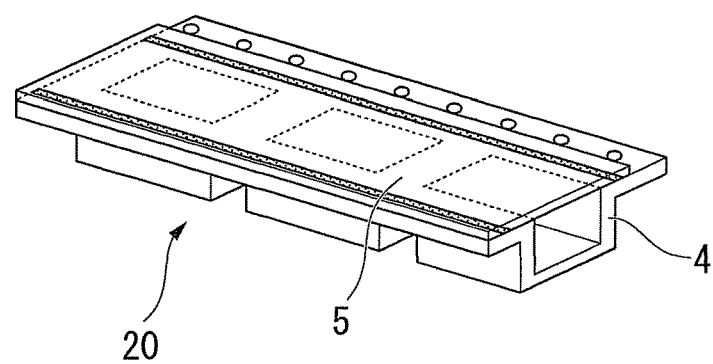
FIG. 3 is a view showing one embodiment of the usage of the cover tape for packaging an electronic part.

For example, as shown in FIG. 3, the cover tape 10 for packaging an electronic part according to the present invention is used as a cover material 5 of a carrier tape 4 for carrying electronic parts which has continuous concave pockets so as to conform the shape of the electronic parts.

Specifically, the cover tape 10 is used as a part of an electronic part package 20 by heat-sealing the cover tape 10 so as to seal openings of the concave pockets. Thereby, it is possible to prevent the fall of the electronic parts stored in the pockets of the carrier tape during transfer or the contamination of foreign substances.

EXAMPLES

Below, examples of the present invention will be explained. However, the present invention is not limited to the following Examples.

Example 1

(1) Production of Cover Tape

On a biaxially stretched polyester film, which has a thickness of 25 μm and is subjected to antistatic treatment (TOYOBO Co., Ltd., E7415, simply referred to as "PET film") as a base layer, a low density polyethylene (Sumitomo Chemical Co., Ltd., SUMICACEN® L705; simply referred to as LDPE) was laminated by an extrusion lamination method at 300° C. such that the thickness is 25 μm as an intermediate layer. Then, a cover tape having a thickness of 10 μm was produced by forming a sealant layer on the intermediate layer produced by extruding a mixture of 15% by weight of styrene-methyl(meth)acrylate copolymer (Nippon Steel & Sumikin Chemical Co., Ltd., ESTYRENE® MS-600, simply referred to as "St-MMA"), 65% by weight of ethylene-methyl acrylate copolymer (Du Pont-Mitsui Polychemicals Co., Ltd., ELVALOY® AC 1820, simply referred to as "EMA 1820", melting point: 92° C., acrylic ester content: 20%), and 20% by weight of polyester/polyolefin copolymer (Sanyo Chemical Industries, PELESTAT® 212, simply referred to as "PEG-PO") at 280° C.

(2) Evaluation of Cover Tape
(2-1) Measurement of Peeling Strength

A sample was produced by a method shown in [0020] using the cover tape obtained, and the peeling strength was measured at measurement speed of 300 mm/min in accordance with JIS K6854-3.

(2-2) Measurement of Surface Resistance Value

The surface resistance value at 23° C. and 50% RH of a surface of the sealant layer which is opposite to the base layer was measure in accordance with JIS K6911.

(2-3) Evaluation of Resistance to Jumping Trouble of Electronic Part Package

The standard difference between the maximum value and the minimum value of the peeling strength, which indicates the existence of jumping trouble when peeling, was set to 90 gf. The resistance to jumping trouble is evaluated in accordance with the following standards.

Excellent: less than 15 gf
Good: 15 gf or more and less than 90 gf
Bad: 90 gf or more The results are shown in Table 1. Moreover, the results of Examples are Excellent.

Example 2

(1) Production of Cover Tape

On the PET film (TOYOBO Co., Ltd., E7415) as a base layer, the LDPE (Sumitomo Chemical Co., Ltd., SUMICACEN® L705) was laminated by an extrusion lamination method at 300° C. such that the thickness is 25 μm as an intermediate layer. Then, a cover tape having a thickness of 10 μm was produced by extruding a mixture of 15% by weight of St-MMA (Nippon Steel & Sumikin Chemical Co., Ltd., ESTYRENE® MS-600), 65% by weight of ethylene-vinyl acetate (Du Pont-Mitsui Polychemicals Co., Ltd., EVA 260, simply referred to as "EVA 260", melting point: 72° C., vinyl acetate content: 28%), and 20% by weight of PEG-PO (Sanyo Chemical Industries, PELESTAT® 212) on the inteimediate layer produced at 280° C.

(2) Evaluation of Cover Tape

The cover tape obtained was evaluated in the same manner as disclosed in [0038]. The results are shown in Table 1.

Example 3

(1) Production of Cover Tape

On the PET film (TOYOBO Co., Ltd., E7415) as a base layer, the LDPE (Sumitomo Chemical Co., Ltd., SUMICACEN® L705) was laminated by an extrusion lamination method at 300° C. such that the thickness is 25 μm as an intermediate layer. Then, a cover tape having a thickness of 10 μm was produced by extruding a mixture of 15% by weight of St-MMA (Nippon Steel & Sumikin Chemical Co., Ltd., ESTYRENE® MS-600), 65% by weight of ethylene-vinyl acetate (Du Pont-Mitsui Polychemicals Co., Ltd., EVA 460, simply referred to as "EVA 460", melting point: 86° C., vinyl acetate content: 19%), and 20% by weight of PEG-PO (Sanyo Chemical Industries, PELESTAT® 212) on the intermediate layer produced at 280° C.

(2) Evaluation of Cover Tape

The cover tape obtained was evaluated in the same manner as disclosed in [0038]. The results are shown in Table 1.

Comparative Example 1

(1) Production of Cover Tape

On the PET film (TOYOBO Co., Ltd., E7415) as a base layer, the LDPE (Sumitomo Chemical Co., Ltd., SUMICACEN® L705) was laminated by an extrusion lamination method at 300° C. such that the thickness is 25 μm as an intermediate layer. Then, a cover tape having a thickness of 10 μm was produced by extruding a mixture of 15% by weight of St-MMA (Nippon Steel & Sumikin Chemical Co., Ltd., ESTYRENE® MS-600), 65% by weight of ethylene-methyl acrylate copolymer (Du Pont-Mitsui Polychemicals Co., Ltd., ELVALOY® AC 1609, simply referred to as "EMA 1609", melting point: 102° C., acrylic ester content: 9%), and 20% by weight of PEG-PO (Sanyo Chemical Industries, PELESTAT® 212) on the intermediate layer produced at 280° C.

(2) Evaluation of Cover Tape

The cover tape obtained was evaluated in the same manner as disclosed in [0038]. The results are shown in Table 1.

Comparative Example 2

(1) Production of Cover Tape

On the PET film (TOYOBO Co., Ltd., E7415) as a base layer, the LDPE (Sumitomo Chemical Co., Ltd., SUMICA-CEN® L705) was laminated by an extrusion lamination method at 300° C. such that the thickness is 25 μm as an intermediate layer. Then, a cover tape having a thickness of 10 μm was produced by extruding EMA 1820 (Du Pont-Mitsui Polychemicals Co., Ltd., ELVALOY® AC 1820) on the intermediate layer produced at 280° C.

(2) Evaluation of Cover Tape

The cover tape obtained was evaluated in the same manner as disclosed in [0038]. The results are shown in Table 1.

TABLE 1

|  |  | Example 1 | Example 2 | Example 3 | Comparative Example 1 | Comparative Example 2 |
|---|---|---|---|---|---|---|
| Melting point of main resin of sealant layer | ° C. | 92 | 72 | 84 | 101 | 92 |
| Peeling manner | — | Cohesive failure delamination | Cohesive failure delamination | Cohesive failure delamination | Cohesive failure delamination | Interfacial delamination |
| Peeling strength | A (g) | 52 | 40 | 42 | 21 | 62 |
|  | C (g) | 35 | 20 | 22 | 3 | 20 |
|  | C (g)/A(g) | 0.67 | 0.52 | 0.52 | 0.14 | 0.32 |
| Surface resistant value of sealant layer | Ω | 1.0E+09 | 1.0E+09 | 1.0E+09 | 1.0E+09 | >1.0E+13 |
| Jumping evaluation in mounting | — | Excellent | Excellent | Excellent | Bad | Bad |

As shown in Table 1, the cover tape obtained in Example 1 to 3 does not easily cause jumping troubles when peeling, and obtains sufficiently stable peeling strength.

DESCRIPTION OF THE REFERENCE NUMERALS 1 base layer
2 sealant layer
3 intermediate layer
4 carrier tape
5 cover material (cover tape)
10 cover tape for packaging an electronic part
20 electronic part package

The invention claimed is:

1. A cover tape for packaging an electronic part which includes a base layer and a sealant layer, and is closely adhered to a carrier tape, wherein the sealant layer is made of a resin composition;
   a main component in the resin composition has a melting point of 100° C. or less;
   a peeling strength A under measurement conditions below after heat-sealing to a polycarbonate sheet through the sealant layer at 220° C. for 0.015 seconds and a peeling strength C under the measurement conditions below after heat-sealing to a polycarbonate sheet through the sealant layer at 180° C. for 0.015 seconds satisfy conditional expressions 1 and 2 below; and
   wherein, peeling the carrier tape causes cohesive failure delamination of the sealant layer such that a part of the sealant layer remains on a surface of the carrier tape to which the sealant layer is closely adhered;

$20\ (g) \le A \le 70\ (g)$                Conditional expression 1:

$0.43 \le C/A \le 1.0$                Conditional expression 2:

Measurement conditions: the sealant layer of the cover tape for packaging an electronic part having a length of 500 mm is adhered to an electro-conductive polycarbonate sheet having a width of 8 mm such that the cover tape and the polycarbonate sheet are overlapped at 5 mm in width, and a peeling strength is measured in accordance with JIS C-0806-3 at measurement speed of 300 mm/min, and the average peeling strength is calculated;
   wherein a main component of the resin composition of the sealant layer is at least one resin selected from the first resin group consisting of polyethylene, ethylene-vinyl acetate copolymer, ethylene-(meth)acrylic acid copolymer, ethylene-methyl(meth)acrylate copolymer, ethylene-methyl acrylate copolymer, ethylene-ethyl acrylate copolymer, and ethylene-butyl acrylate copolymer, and
   the sealant layer further comprises at least one incompatible resin selected from the second resin group consisting of polystyrene, styrene.butadiene.styrene block copolymer (SBS), styrene.ethylene.butylene.styrene block copolymer (SEBS), styrene.isoprene.styrene block copolymer (SIS), styrene.ethylene.propylene.styrene block copolymer (SEPS), hydrogenated styrene.butadiene random copolymer (HSBR), styrene-methyl(meth)acrylate copolymer (MS), styrene.acrylonitrile copolymer resin (SAN), and acrylonitrile.butadiene.styrene resin (ABS).

2. The cover tape for packaging an electronic part according to claim 1,
   wherein the cover tape further includes an intermediate layer between the base layer and the sealant layer;
   a resin of the base layer includes at least one selected from the group consisting of biaxially stretched polyester and biaxially stretched polypropylene, and
   when the cover tape is peeled from the carrier tape, cohesive failure of the sealant layer occurs, and a part of the sealant layer remains on the carrier tape.

3. The cover tape for packaging an electronic part according to claim 1, wherein a surface resistance value at 23° C. and 50% RH of the sealant layer which is opposite to the base layer is $1 \times 10^{12} \Omega$ or less.

4. The cover tape for packaging an electronic part according to claim 2,
wherein a main component of the resin composition of the sealant layer is at least one selected from the group consisting of polyethylene, ethylene-vinyl acetate copolymer, ethylene-(meth)acrylic acid copolymer, ethylene-methyl (meth)acrylate copolymer, ethylene-methyl acrylate copolymer, ethylene-ethyl acrylate copolymer, and ethylene-butyl acrylate copolymer.

5. The cover tape for packaging an electronic part according to claim 2, wherein a surface resistance value at 23° C. and 50% RH of the sealant layer which is opposite to the base layer is $1 \times 10^{12} \Omega$ or less.

6. The cover tape for packaging an electronic part according to claim 1, wherein a surface resistance value at 23° C. and 50% RH of the sealant layer which is opposite to the base layer is $1 \times 10^{12} \Omega$ or less.

7. A cover tape for packaging an electronic part which includes a base layer and a sealant layer, and is closely adhered to a carrier tape,
wherein the sealant layer is made of a resin composition;
a main component in the resin composition has a melting point of 100° C. or less;
a peeling strength A under measurement conditions below after heat-sealing to a polycarbonate sheet through the sealant layer at 220° C. for 0.015 seconds and a peeling strength C under the measurement conditions below after heat-sealing to a polycarbonate sheet through the sealant layer at 180° C. for 0.015 seconds satisfy conditional expressions 1 and 2 below; and
after peeling, the carrier tape causes cohesive failure delamination of the sealant layer such that a part of the sealant layer remains on a surface of the carrier tape to which the sealant layer is closely adhered;

$20 \text{ (g)} \leq A \leq 70 \text{ (g)}$     Conditional expression 1:

$0.43 \leq C/A \leq 1.0$     Conditional expression 2:

Measurement conditions: the sealant layer of the cover tape for packaging an electronic part having a length of 500 mm is adhered to an electro-conductive polycarbonate sheet having a width of 8 mm such that the cover tape and the polycarbonate sheet are overlapped at 5 mm in width, and a peeling strength is measured in accordance with JIS C-0806-3 at measurement speed of 300 mm/min, and the average peeling strength is calculated;
wherein the sealant layer comprises at least one resin selected from a first group of resins consisting of an ethylene-based resin, a methacrylate-based resin, an ethylene glycol-based resin, and a polystyrene-based resin; and
the sealant layer further comprises at least one incompatible resin selected from the second group of resins consisting of polystyrene, styrene.butadiene.styrene block copolymer (SBS), styrene.ethylene.butylene.styrene block copolymer (SEBS), styrene.isoprene.styrene block copolymer (SIS), styrene.ethylene.propylene.styrene block copolymer (SEPS), hydrogenated styrene.butadiene random copolymer (HSBR), styrene-methyl(meth)acrylate copolymer (MS), styrene.acrylonitrile copolymer resin (SAN), and acrylonitrile.butadiene.styrene resin (ABS).

* * * * *